United States Patent [19]

Benedetto et al.

[11] 4,232,553
[45] Nov. 11, 1980

[54] ANGULAR ACCELERATION SENSING APPARATUS

[75] Inventors: Kenneth R. Benedetto, Medway; Larry J. Linder, Dayton, both of Ohio

[73] Assignee: KBG Corporation, Medway, Ohio

[21] Appl. No.: 3,489

[22] Filed: Jan. 12, 1979

[51] Int. Cl.$^3$ ............................................. G01P 15/08
[52] U.S. Cl. .............................. 73/516 LM; 73/204; 73/517 A
[58] Field of Search ................... 73/204, 505, 516 LM

[56] References Cited

U.S. PATENT DOCUMENTS

| | | | |
|---|---|---|---|
| 2,644,901 | 7/1953 | Hardway, Jr. | 73/516 LM X |
| 3,293,921 | 12/1966 | Riordan et al. | 73/516 LM |
| 3,677,085 | 7/1972 | Hayakawa | 73/204 |
| 3,910,123 | 10/1975 | Evans et al. | 73/516 LM |
| 3,960,691 | 6/1976 | Zoltan et al. | 73/516 LM X |

OTHER PUBLICATIONS

J. L. Lumley, "The Constant Temperature Hot-Thermistor Anemometer", Symposium on Measurement in Unsteady Flow, May 21-23, 1962.

*Primary Examiner*—Charles A. Ruehl
*Attorney, Agent, or Firm*—Becker & Becker, Inc.

[57] ABSTRACT

An angular acceleration sensing device which operates on a principle whereby the relative motion of a volume of gas or fluid contained within an annular ring or torroid is sensed when the container is subjected to an angular acceleration about an axis perpendicular to the plane of the fluid ring. The apparatus includes an enclosed circular fluid-filled channel which can be an annular ring or torroid; thermally sensitive elements suspended within the fluid channel and an electronic circuit providing power to the sensing elements and output voltages.

10 Claims, 9 Drawing Figures

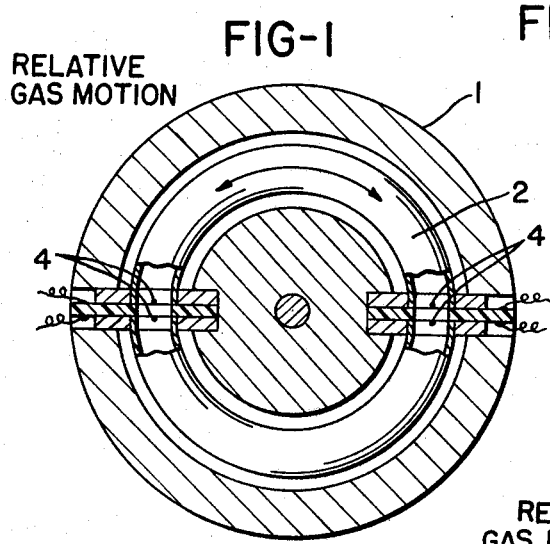
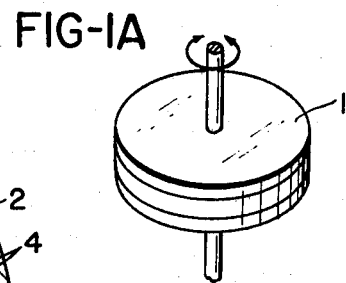
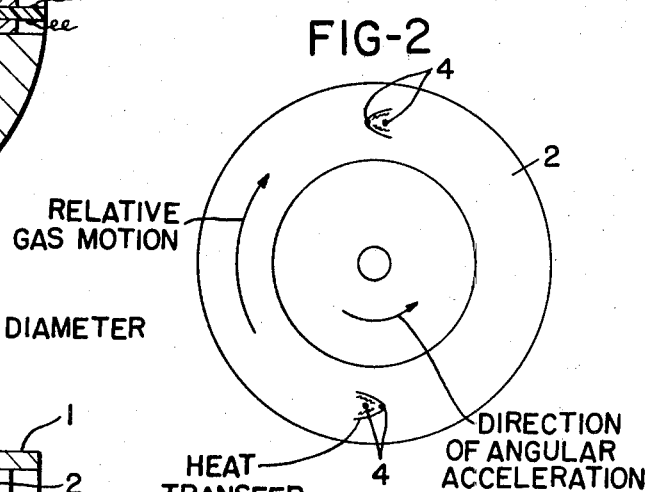
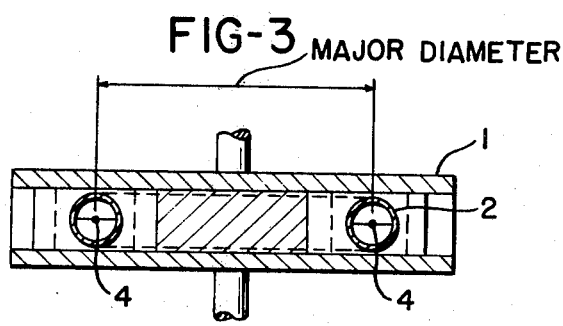
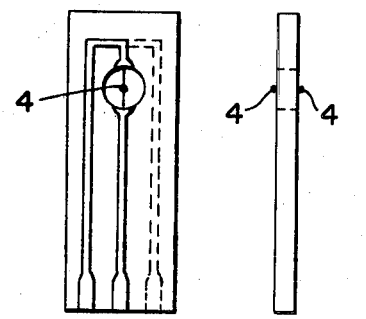
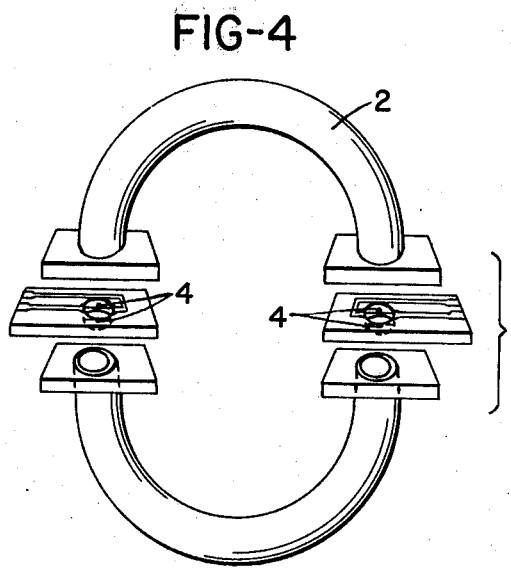

ANGULAR ACCELERATION SENSING APPARATUS

BACKGROUND OF THE INVENTION

1. Field of the Invention

This invention relates to angular accelerometers and more particularly to a type of device which operates on a principle whereby the relative motion between a gas or fluid volume (inertial mass) contained within an annulus or torroid is sensed by means of measuring the heat transfer between thermally sensitive elements located within the fluid volume and fixed in position to the container.

2. Description of the Prior Art.

The operation of all common types of linear or angular accelerometers is based on Newton's Second Law of Motion: Force=Mass×Acceleration (F=MA). A force on a mass is proportional to the amount of acceleration to which the mass is subjected. As the force on a mass is measured, the amount of acceleration can be determined. Common types of accelerometers known to prior art include:

(1) Potentiometric: An applied acceleration moves a sensitive mass which is a sliding contact of a resistive element.

(2) Strain Gauge Type: An acceleration sensitive mass is mounted to a wire which changes resistance in proportion to the applied forces. The resistance is usually determined using a Wheatstone Bridge Circuit.

(3) Piezo-Electric: A piezo-electric crystal produces an electrical output proportional to an applied force (acceleration).

(4) Variable Reluctance: The reluctance of a magnetic path is varied by an acceleration sensitive moving armature producing an output proportional to applied acceleration.

(5) Servo Accelerometers: An acceleration sensitive mass (liquid or solid), when subjected to a force, causes a position error signal to be generated, which through servo action, or feedback, force restores the mass to its original position. The feedback required is proportional to the applied force, i.e. acceleration.

The disadvantages of these types of accelerometers in addition to being difficult to manufacture and thus relatively costly are their limited frequency response, poor cross-axis sensitivity, and poor temperature sensitivity characteristics. In addition, their reliance on mechanical couplings and their connections to an acceleration sensitive seismic mass generates peculiarities to each type which effect the device performance characteristics, such as linearity, hysteresis, repeatability, phase angle, null offset and null uncertainty because of mechanical variations and wear due to random vibration and normal useage.

SUMMARY OF THE INVENTION

It is an object of the present invention to provide a reliable and relatively low-cost apparatus for use in determining angular acceleration. It is a more particular object of this invention to provide an apparatus for measuring angular acceleration which is a simple design and construction and does not include any moving mechanical parts, mechanical linkages or servo mechanisms.

In the attainment of these and other objects, the invention provides a container which is securable to an object under study. Rigidly mounted in the container is a hollow and continuous annular ring or torroid constructed out of dielectric or conductive materials providing for free circular movement of a fluid contained therein. Fixed in position, in the center of the fluid channel are located thermally sensitive resistive elements. The preferred embodiment of this invention includes four elements positioned within the fluid channel in the following manner:

Two of the four sensitive elements are mounted in close proximity to each other along the center of the fluid volume at the radius of annular or circular revolution. At the opposite end of the major diameter (on the other side) of the annular ring or torroid are located in the same manner as the first two, two additional sensitive elements. The elements are located in the fluid volume such that if flow were induced in the fluid volume within the channel, the "wake" of fluid flow over one element "washes" its neighboring element. The effect of the fluid flow and washing effect are such as to cause an imbalance in heat transfer from the sensitive elements, resulting in more or less electrical power being required to maintain the elements at a constant temperature.

The fluid motion which develops relative to the sensing elements which are rigidly affixed to the walls of the annular ring or torroid which is rigidly affixed to the container mounted on the object under study is a result of the inertial mass of the fluid and its low value of viscous interaction with the inside walls of the torroidal-shaped chamber. A relative indication of the effect of fluid viscosity under normal gas flow conditions is the Reynold's Number of flow.

$$R = \frac{\rho V \alpha \lambda}{\tau}$$

where
$\rho$=fluid density, $v$=fluid velocity,
$\lambda$=a characteristic dimension, for an annular ring, this would be the height of the channel; for a torroid, this would be the minor diameter of the torroid,
$\eta$=fluid viscosity.

$v$, the fluid velocity, for purposes of use in this equation is based on a theoretical "friction free" fluid velocity and represents the velocity of one pair of sensor elements relative to the sensor elements at the opposite diameter under a specified angular rotation. The characteristics of the device which dominate its performance are the fluid density, viscosity and thermal heat transfer characteristics which include thermal conductivity, coefficient of expansion, and density, which combine to yield a term called thermal diffusivity.

Physical geometric parameters of importance are the separation distance between pairs of sensing elements, the channel height or minor diameter of the torroid and the major diameter of the torroid.

Experiments indicate that a Reynolds number of at least 10 is required for adequate sensitivity. Element spacing is on the order of 0.010 inches 0.100 inches. Spacing between the elements of each pair must be identical. The smaller the spacing between elements, the more sensitive the device becomes until undesirable thermal interaction occurs between elements resulting in output noise from the device. The major diameter of the ring or torroid affects the device sensitivity in a directly linear fashion. This is seen in both experiment and in the relation $$\dot{\omega} = \frac{\dot{v}}{r},$$

where $\dot{v}$=linear acceleration of the sensing elements, $\dot{\omega}$=angular acceleration and $\nu$=radial distance from the center of the ring or torroid to the element position. The thermally sensitive resistive elements which comprise the sensing means in this invention can be thermistor elements or fine, small diameter wires. The method of sensing is achieved by maintaining the sensing elements at some constant temperature which is above ambient temperatures, typically from 75° C. up to 150° C. Device performance is weakly affected by this temperature with sensitivity increasing with increasing element temperature up to a point where thermal noise problems dominate. Electrical signal output proportional to angular acceleration is achieved by the same external electrical circuit which is used to maintain the elements at a constant temerature. This is accomplished by measuring the voltage required to maintain this temperature across each element. In the case of thermistor elements, this is accomplished with an electrical circuit which forces the thermistor elements to operate at some preselected resistance which corresponds to the desired operating temperature. An important parameter of the sensing elements is their thermal identity or matched electrical/thermal characteristics. In order to achieve low zero drift in the device with ambient temperature fluctuations, the thermal dissipation constant of each element should be matched over the desired expected operating temperature range. An embodiment of this invention which provides for directional sensitivity is achieved by their position, electrical connection and electrical amplification of sensor elements and electrical output variations of the sensor elements. As previously described, the position of the sensitive elements is such that in a field of fluid flow, the wake of one element washes onto its neighboring element, and since the elements are being heated by an external electrical circuit and changes in their heat transfer are sensed by the same electrical circuit; the leading element is cooled by the fluid motion and the trailing element is heated by the wake of the leading element. At the opposite diameter of the torroid, the relative fluid motion is in the opposite direction, and the electrical sense of the sensing elements is thereby reversed. The sensing elements are electrically connected to yield signals which reflect this polarity. Under conditions of opposite angular acceleration direction, the above fluid motion is reversed, thereby reversing the electrical output polarity.

The foregoing and other objects and features of the invention will be evident from the following detailed description of preferred embodiments thereof and from the drawings wherein like reference numerals identify like-parts throughout.

DESCRIPTION OF THE DRAWINGS

FIG. 1 is a simplified cross-sectional view of the angular accelerometer illustrating the location of the sensor elements.

FIG. 1A is a perspective view of the accelerometer.

FIG. 2 is an illustration of the principal of operation of the angular accelerometer.

FIG. 3 is a simplified cross-sectional view normal to the cross section of FIG. 1.

FIG. 4 is an enlarged view of drawing of the angular accelerometer in torroidal construction illustrating the construction and assembly of parts.

FIG. 5 is an illustration of the mounting technique for mounting and positioning the sensor elements.

FIG. 5A illustrates an end view of elements in FIG. 5.

DESCRIPTION OF THE PREFERRED EMBODIMENT

Referring to FIG. 1, a container 1 is secured to an object, the angular acceleration of which is to be measured. A conduit 2, which is an annular ring or torroid is rigidly mounted to the container, with its plane parallel to the plane of angular motion of the object under study. The conduit 2 preferably comprises thermally conductive material in order to reduce the effects of thermal gradients; however, non-conductive material can be used. The inside wall of the conduit 2 should be as smooth as possible so as to reduce the wall friction with the fluid inside.

A relatively inert fluid, e.g. air, helium, carbon dioxide or a liquid, is introduced into the conduit 2 and the conduit is sealed. As previously discussed, the important properties of the fluid are its density and viscosity. The fluid, in the case of a gas, may be introduced into the conduit at an elevated pressure, thus increasing the density of the fluid in direct proportion to pressure while not appreciably changing the fluid viscosity. The result is a larger value of density to viscosity ratio which increases the sensitivity of the device. Rigidly secured to, but electrically insulated from the conduit and traversing thru the center of the conduit channel, are thermally sensitive resistive elements 4, located within and about the conduit as in FIG. 1. An embodiment of this invention includes the number of elements 4 which may be connected in the conduit 1. FIG. 1 shows two pairs of elements; however, as may be evident, any number of elements may be arraigned about and within the conduit. By properly connecting and adding electrical signals from any number of elements, the sensitivity of the device may be increased almost indefinitely. The sensitive elements may be small bead thermistors or very fine tungsten or platinum wires. The critical parameters are their thermal dissipation constant and mass.

FIG. 5 illustrates a method of mounting the sensor elements 4 within a torroidal geometry conduit 2. An enlarged illustration of an example of the torroidal geometry assembly is provided in FIG. 4.

FIG. 2 is an illustration of the principle of operation of the device as previously described.

Figure 6:
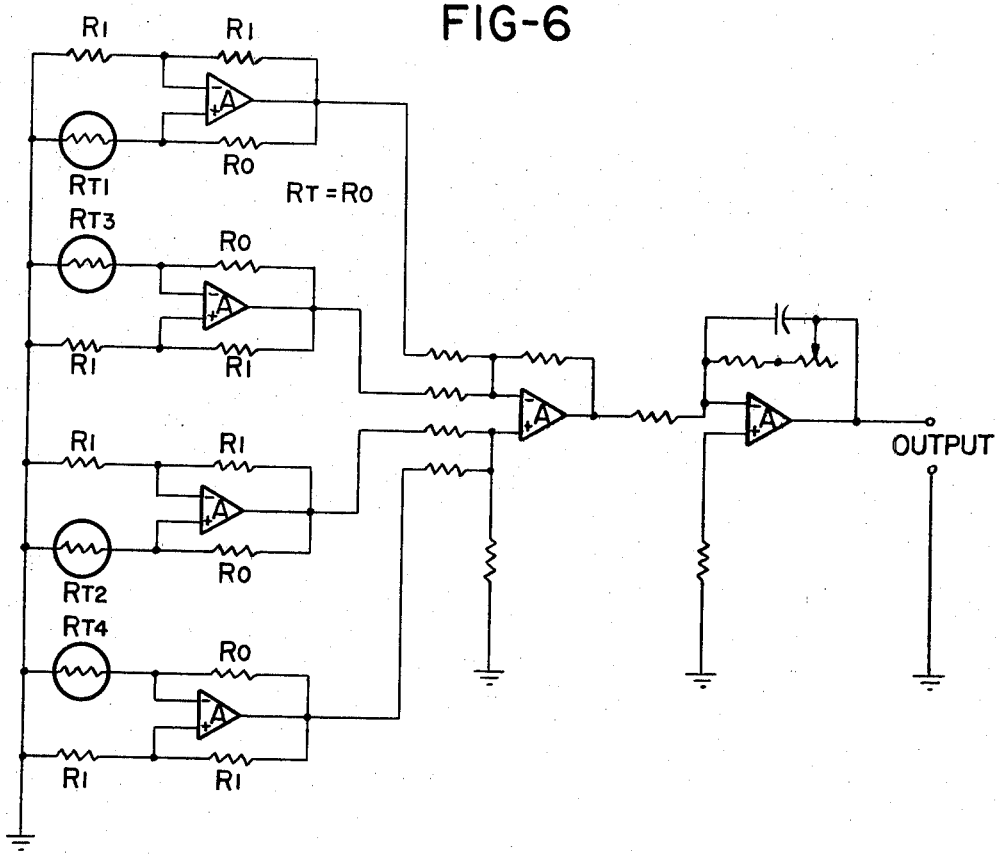
FIG. 6 is a schematic representation of the electrical circuit used to maintain thermistor sensing elements at a constant temperature and signal amplification and output.
Figure 7:
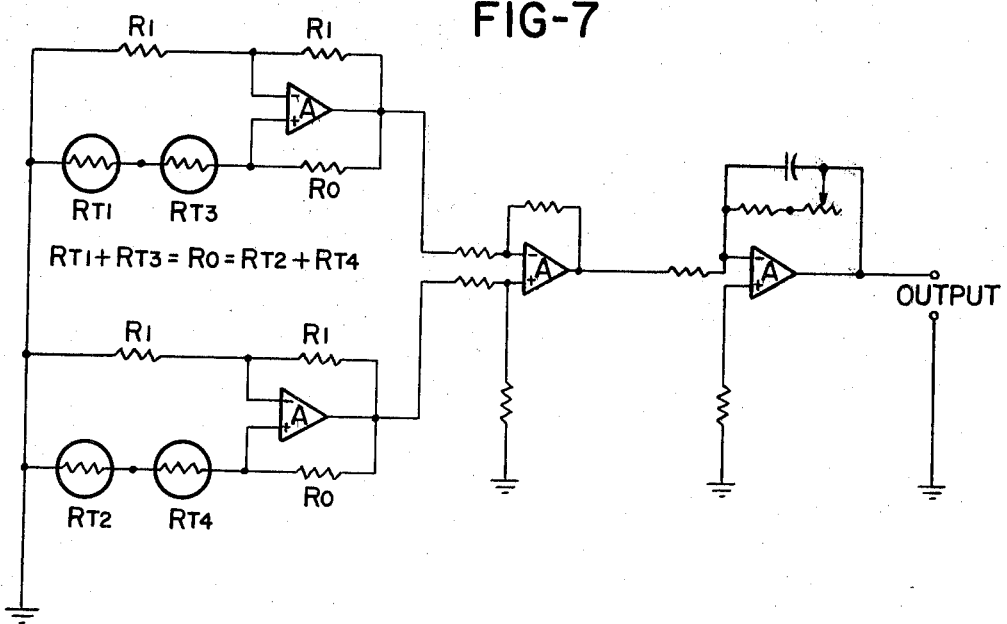
FIG. 7 is an alternate form of electrical schematic representation.

The sensing elements are connected to an external electrical circuit of the type shown in FIGS. 6 and 7. The electrical circuits shown are of the type used for operating thermistor elements in a constant resistance mode. A constant resistance mode of thermistor operation is the equivalent of a constant temperature mode. This invention contemplates the operation of thermally sensitive elements in variations of the electrical circuits and modes of operation such as those presented in the electrical circuit schematic drawings of FIGS. 6 and 7.

Accordingly, the elements may be operated in constant voltage, constant current or constant power modes.

As previously described, the sensing elements should be matched in resistance at the chosen operating element temperature. In addition, their thermal dissipation constants should be matched over the operating temperature referenced to variations in ambient temperatures of the environment. If the elements are not exactly matched, a zero drift will result corresponding to ambient temperature variations. Since perfect matching of elements is not practical in a production version of the device, an embodiment of the invention relates to environmental temperature stabilization or correction. Either of two methods may be applied to accomplish this objective. One is ambient temperature control utilizing thermally insulated containers and termperature regulating electrical circuits; the other is temperature compensation utilizing temperature sensitive elements such as a thermocouple and applying the thermocouple output as bias to the accelerometer output signal.

The present invention relates to an angular acceleration sensing device which measures angular acceleration, and after electrical integration of the output signal, yields angular rate or velocity in a singular plane. The device operates on a principle whereby, as an enclosed annular ring or torroid containing a gas (any gas) is subjected to an angular or rotational acceleration about an axis normal to the plane of the annular ring or torriod, because of the inherent inertia of the gas within the ring; a relative gas motion or gas flow develops within the annular ring until viscous effects "drag" the gas volume velocity to equal the velocity of the container.

Gas flow sensing detectors are immersed in the gas contained within the annular ring or torroid and attached to the container. These detectors sense the relative motion between the mechanical annular ring container and the contained gas. Except for second or third order compressibility effects, which are insignificant, the device is only sensitive to angular accelerations about an axis of rotation normal to the plane formed by the annular ring or torroid.

The sensing means, which is part of the invention, consists of two pairs of matched thermistors or hot wires, of the type used in anemometers, and associated electronic circuitry. One thermistor of a matched pair is suspended in the center of the gas flow channel of the annular ring or torroid, the other matched thermistor is like-wise mounted in the gas flow channel on the opposite side of the ring. Another thermistor of a second matched pair is mounted in close proximity (on the order of 0.010"—0.100") to one of the thermistors already mounted, exactly in its shadow or wake. The other thermistor of the second matched pair is likewise mounted next to the other thermistor of the first matched pair on the same side of the ring major diameter as the first thermistor of the second matched pair.

Each pair of matched thermistors or hot wires are maintained at an equal and constant temperature by means of an appropriate external electrical circuit which supplies current to the thermistors. The temperature at which the thermistors are maintained can be anywhere from ambient temperature up to the maximum temperature at which the thermistors may be operated. The selected operating temperature must be maintained constant by the electrical circuit. The selected operating temperature will affect the device sensitivity and signal to noise ratio. The thermistors or hot wires (sensing elements) are located and spaced in such a position that gas movements within the ring or torroid relative to the sensing elements cause unequal heat transfer from the sensing elements depending on the magnitude and direction of gas movement within the annular ring or torroid.

The positions of the sensing elements within the ring and their electrical connections are such that when relative gas motion occurs (i.e. when the device is rotated) the gas flow over one element "washes" onto its neighboring element. The same thing occurs on the opposite diameter of the ring except in the opposite direction. This "washing" results in the unequal heat transfer between the elements. The effect is that neighboring elements of each pair acts as "heaters" and "sensors" to each other depending on the direction of gas flow. This feature is what gives the device "directional" sensitivity.

The magnitude and direction of relative gas movement within the ring resulting in unequal heat transfer from the sensing elements is sensed by the external electrical circuit by measuring the amount of electrical power required to maintain the sensing elements at a constant and equal temperature.

Each pair of sensing elements is connected in a balanced bridge configuration electrical circuit. The measured output of each bridge circuit is the result of a heat transfer differential between the two sensing elements. A measured differential output signal between the two electrical bridges is twice the output measured from one bridge circuit.

Additional matched pairs of sensing elements can be installed within the annular ring or torroid and their outputs added electrically to any practical limit of sensitivity.

The electrical output of the bridge circuits is directly proportional to magnitude and direction of the angular acceleration to which the device is subjected. This signal when processed through an integrating amplifier circuit yields a signal which is directly proportioned to angular rate or velocity. If the signal is doubly integrated with appropriate limits the output yields angular position.

GENERAL STATEMENTS

Annular Ring or Torroid

The angular acceleration sensitivity of the device is directly proportional to the major diameter of the gas flow channel. This is seen in both experiment and the relation, $v = \dot{w}r$, where $v =$ linear acceleration of sensing elements, $\dot{w} =$ angular acceleration and $r =$ radius from the center to element position.

The cross sectional dimensions of the annular ring are important due to gas viscosity effects. If the cross sectional height is made small (<0.100") viscous drag from the wall reduces the device sensitivity. Estimates of a Reynold's Number for the gas flow can be made using the cross sectional height as a characteristic dimension and a "friction-free" velocity of gas flow relative to the sensing elements. The viscosity of the gas used and its pressure yield $R = Co\ Vo\ ho$. Using air at atmospheric pressure in the annular ring experiments indicate that sensitivity is dominated by viscosity at estimated Reynold's Numbers less than about 10.

GAS

Important characteristics of the gas are its density, its viscosity and its corrosiveness. Ideally, a non-corrosive, extremely dense gas with an extremely low viscosity is desirable for maximum sensitivity.

The device can be constructed to operate at elevated gas pressure which should increase sensitivity. The reason for having to use two pairs of sensing elements instead of just one pair is to cancel out orientation sensitivity of the device. A metal such as tungsten or platinum can be used for the fine, small wires of the elements. The wires, however, can be of any of a variety of materials such as used in "hot wire" or "constant current" anemometry. The sensitive elements can be operated in a "constant current" mode as well as a "constant temperature" mode, the difference being more stable and better response in "constant temperature" mode. The electrical circuit for "constant current" mode is different from the "constant temperature" circuit.

All developments and action conducted to date have been with air at atmospheric pressure.

It is, of course, to be understood that the present invention is, by no means, limited to the specific showing in the drawings but also comprises any modifications within the scope of the appended claims.

What is claimed is as follows:

1. An angular acceleration sensing apparatus free of any moving mechanical parts, mechanical linkages, servo mechanisms and the like and operative on a principle whereby relative motion of a volume of fluid contained within a hollow torroid is sensed when a container securable to an object under study is subjected to an angular acceleration about an axis perpendicular to a plane of the torroid, comprising: an enclosed circular fluid-filled channel in the form of a torroid rigidly mounted in the container, pairs of thermally sensitive resistive elements suspended within said channel in fixed position, means for maintaining said elements at a constant temperature including an electrical circuit which forces said elements to operate at a preselected resistance corresponding to desired operating temperatue, and means electrically connected with respect to said circuit and said elements to yield signals respresentative of angular acceleration.

2. An apparatus according to claim 1, in which said elements are mounted in close proximity to each other centrally along a fluid volume in said torroid such that flow induced in the fluid volume wihthin the channel has "wake" of fluid flow over one element "wash" over its neighboring element with fluid flow and washing effect causing an imbalance in heat transfer from said sensitive elements requiring more or less electrical power from said circuit to maintain said element at a constant temperature resulting in a relative indication of acceleration therewith.

3. An apparatus according to claim 2, in which said elements are pairs of matched thermistors.

4. An apparatus according to claim 2, in which said elements are fine, small diameter wires.

5. An apparatus according to claim 2, in which said elements are fine, small diameter wires of a metal from a group including tungsten and platinum.

6. An apparatus according to claim 2, in which four said elements are positioned within said torroid in pairs at opposite ends of the major diameter of said torroid with performance being influenced by fluid density, viscosity and thermal heat transfer characteristics including thermal conductivity, coefficient of expansion and density combined.

7. An apparatus according to claim 2, in which said elements are in pairs at each of opposite ends of a major diameter of said torroid providing a relative indication of effect of fluid viscosity with a characteristic Reynold's Number of at least 10 being required for increased sensitivity.

8. An apparatus according to claim 2, in which said elements are maintained at a constant temperature above ambient temperatures at a value in a range between 75° C. and 150° C.

9. An apparatus according to claim 2, in which said elements are heated from said circuit and changes in heat transfer are sensed by said circuit with the leading element being cooled by the fluid motion and the trailing element being heated by the wake of the leading element.

10. An apparatus according to claim 9, wherein relative fluid motion occurs oppositly in the torroid so that electrical polarity of said elements is thereby reversed, said elements being connected electrically to yield electrical signals which reflect this polarity, the electrical signals being proportional to angular acceleration measured on the basis of voltage required to maintain a constant temperature across each element.

* * * * *